(12) United States Patent
Liu et al.

(10) Patent No.: US 12,554,614 B2
(45) Date of Patent: Feb. 17, 2026

(54) METHOD, ELECTRONIC DEVICE, AND COMPUTER PROGRAM PRODUCT FOR DATA PROCESSING, ANALYSIS, AND ABNORMALITY DETERMINATION OF LOGS CORRESPONDING TO OPERATIONS

(71) Applicant: EMC IP Holding Company LLC, Hopkinton, MA (US)

(72) Inventors: Weiyang Liu, Shanghai (CN); Lihui Su, Shanghai (CN); Qi Wang, Shanghai (CN); Min Liu, Shanghai (CN); Yujun Liang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 56 days.

(21) Appl. No.: 17/387,023

(22) Filed: Jul. 28, 2021

(65) Prior Publication Data
US 2022/0405184 A1 Dec. 22, 2022

(30) Foreign Application Priority Data
Jun. 18, 2021 (CN) .......................... 202110681030.3

(51) Int. Cl.
| G06F 11/00 | (2006.01) |
| G06F 11/07 | (2006.01) |
| G06F 11/30 | (2006.01) |
| G06F 11/32 | (2006.01) |

(52) U.S. Cl.
CPC ...... *G06F 11/3075* (2013.01); *G06F 11/0772* (2013.01); *G06F 11/0775* (2013.01); *G06F 11/3006* (2013.01); *G06F 11/327* (2013.01)

(58) Field of Classification Search
CPC ............ G06F 11/0772; G06F 11/0775; G06F 11/3006; G06F 11/3075; G06F 11/327
See application file for complete search history.

(56) References Cited

U.S. PATENT DOCUMENTS

| 9,542,255 | B2 * | 1/2017 | Fu .................. G06F 11/0724 |
| 9,910,882 | B2 * | 3/2018 | Gnech .............. G06F 16/2365 |
| 10,069,699 | B2 * | 9/2018 | Kimura ............ H04L 41/0686 |
| 10,685,292 | B1 * | 6/2020 | Milo .................... G06N 20/00 |
| 10,831,586 | B2 * | 11/2020 | Li ...................... G06F 11/079 |

(Continued)

*Primary Examiner* — Elmira Mehrmanesh
(74) *Attorney, Agent, or Firm* — WOMBLE BOND DICKINSON (US) LLP

(57) ABSTRACT

Embodiments of the present disclosure provide a method, an electronic device, and a computer program product for data processing. The method described herein includes determining identification information for an operation, wherein the identification information includes at least one field indicating content of the operation and a field indicating a unique identification of the operation. The method further includes identifying, based on the identification information, log entries for the operation in log files for at least one microservice invoked by the operation. The method further includes determining a log for the operation, wherein the log includes the identified log entries. With the solution for data processing of the present application, it is possible to easily acquire logs for an operation using identification information that includes a field indicating the content of the operation, so as to facilitate targeted analysis of the operation based on the content of the operation.

20 Claims, 6 Drawing Sheets

(56) References Cited

U.S. PATENT DOCUMENTS

| | | | |
|---|---|---|---|
| 10,929,218 B2* | 2/2021 | Xu | G06F 11/079 |
| 11,194,692 B2* | 12/2021 | Xu | G06F 11/3447 |
| 11,294,754 B2* | 4/2022 | Xu | G06F 11/0709 |
| 11,301,355 B2* | 4/2022 | Gong | G06F 11/079 |
| 11,307,953 B2* | 4/2022 | Wang | G06F 11/0709 |
| 2016/0124792 A1* | 5/2016 | Togawa | G06F 11/0751 714/37 |
| 2017/0004188 A1* | 1/2017 | Gupta | G06F 16/21 |
| 2018/0046529 A1* | 2/2018 | Togawa | G06F 11/0787 |
| 2018/0060211 A1* | 3/2018 | Allen | G06F 11/3698 |
| 2019/0095313 A1* | 3/2019 | Xu | G06F 11/3447 |
| 2019/0370347 A1* | 12/2019 | Levy | G06F 18/22 |
| 2019/0372827 A1* | 12/2019 | Vasseur | H04L 41/16 |
| 2020/0097579 A1* | 3/2020 | Manjappa | G06F 16/2358 |
| 2021/0051503 A1* | 2/2021 | Bodiga | H04W 24/04 |
| 2021/0097438 A1* | 4/2021 | Matsumoto | G06N 7/01 |
| 2022/0171800 A1* | 6/2022 | Kumaresan | G06F 11/321 |
| 2022/0368696 A1* | 11/2022 | Karpovsky | H04L 63/0236 |

* cited by examiner

| Microservice | 010101d6b9ae19ff |
|---|---|
| A | [2020-12-26T20:19:10.123Z] [INFO] backup serverA starts |
| B | [2020-12-26T20:19:19.233Z] [INFO] get 2 disks, total size = 1024 GiB |
| B | [2020-12-26T20:19:23.321Z] [INFO] start snapshot |
| B | [2020-12-26T20:19:33.451Z] [INFO] complete snapshot |
| C | [2020-12-26T20:19:43.372Z] [INFO] start transfer data |
| C | [2020-12-26T20:21:03.560Z] [INFO] delta data transferred: 28 GiB |
| A | [2020-12-26T20:21:16.827Z] [INFO] complete backup serverA |

| Microservice: | 010101d6b9ae19ff |
|---|---|
| A | [2020-12-26T20:19:10.123Z] [INFO] backup serverA starts |
| B | [2020-12-26T20:19:19.233Z] [INFO] get 2 disks, total size = 1024 GiB |
| B | [2020-12-26T20:19:23.321Z] [INFO] start snapshot |
| B | [2020-12-26T20:19:33.451Z] [INFO] complete snapshot |
| C | [2020-12-26T20:19:43.372Z] [INFO] start transfer data |
| C | [2020-12-26T20:21:03.560Z] [INFO] delta data transferred: 28 GiB |
| A | [2020-12-26T20:21:16.827Z] [INFO] complete backup serverA |

400

| Microservice: | 010101d6b9ae19ee |
|---|---|
| A | [2020-12-27T20:19:10.123Z] [INFO] backup serverA starts |
| B | [2020-12-27T20:19:19.233Z] [INFO] get 2 disks, total size = 1024 GiB |
| B | [2020-12-27T20:19:23.321Z] [INFO] start snapshot |
| B | [2020-12-27T20:19:33.451Z] [INFO] complete snapshot |
| C | [2020-12-27T20:19:43.372Z] [INFO] start transfer data |
| C | [2020-12-27T20:21:03.560Z] [INFO] delta data transferred: 33 GiB |
| A | [2020-12-27T20:21:16.827Z] [INFO] complete backup serverA |

510

| Microservice: | 010101351966b0aa |
|---|---|
| A | [2020-12-26T20:19:10.123Z] [INFO] backup serverB starts |
| B | [2020-12-26T20:19:19.233Z] [INFO] get 6 disks, total size = 3096 GiB |
| B | [2020-12-26T20:19:23.321Z] [INFO] start snapshot |
| B | [2020-12-26T20:19:33.451Z] [INFO] complete snapshot |
| C | [2020-12-26T20:19:43.372Z] [INFO] start transfer data |
| C | [2020-12-26T20:21:03.560Z] [INFO] delta data transferred: 56 GiB |
| A | [2020-12-26T20:21:16.827Z] [INFO] complete backup serverB |

520

| Microservice: | 010101351966b0bb |
|---|---|
| A | [2020-12-27T20:19:10.123Z] [INFO] backup serverB starts |
| B | [2020-12-27T20:19:19.233Z] [INFO] get 6 disks, total size = 3096 GiB |
| B | [2020-12-27T20:19:23.321Z] [INFO] start snapshot |
| B | [2020-12-27T20:19:33.451Z] [INFO] complete snapshot |
| C | [2020-12-27T20:19:43.372Z] [INFO] start transfer data |
| C | [2020-12-27T20:21:03.560Z] [WARN] cannot connect storageA, retry |

530

| Log pattern |
|---|
| backup ▓▓▓ starts |
| get ▓▓▓ disks, total size = ▓▓▓ GiB |
| delta data transferred: ▓▓▓ GiB |
| complete backup ▓▓▓ |

METHOD, ELECTRONIC DEVICE, AND COMPUTER PROGRAM PRODUCT FOR DATA PROCESSING, ANALYSIS, AND ABNORMALITY DETERMINATION OF LOGS CORRESPONDING TO OPERATIONS

CROSS-REFERENCE TO RELATED APPLICATION

This patent application claims priority, under 35 U.S.C. § 119, of Chinese Patent Application No. 202110681030.3, filed Jun. 18, 2021, which is incorporated by reference in its entirety.

TECHNICAL FIELD

Embodiments of the present disclosure relate to the field of data processing, and in particular relate to a method, an electronic device, and a computer program product for data processing.

BACKGROUND

Most modern companies now have log systems for their products. When a problem occurs, logs, especially those that have a level of warning or higher, can be used to find out why the problem occurs. However, there are usually a large number of logs that have a level of warning or higher and it is difficult to filter log entries related to a specific operation from the logs. Therefore, it is difficult to determine the log entries for a specific operation and trace therefrom the cause of the problem.

SUMMARY OF THE INVENTION

In a first aspect of the present disclosure, a method for data processing is provided. This method includes determining identification information for an operation, wherein the identification information includes at least one field indicating content of the operation and a field indicating a unique identification of the operation. The method further includes identifying, based on the identification information, log entries for the operation in log files for at least one microservice invoked by the operation. The method further includes determining a log for the operation, wherein the log includes the identified log entries.

In a second aspect of the present disclosure, an electronic device is provided. The electronic device includes a processor and a memory coupled to the processor, the memory having instructions stored therein which, when executed by the processor, cause the device to execute actions. The actions include determining identification information for an operation, wherein the identification information includes at least one field indicating content of the operation and a field indicating a unique identification of the operation. The actions further include identifying, based on the identification information, log entries for the operation in log files for at least one microservice invoked by the operation. The actions further include determining a log for the operation, wherein the log includes the identified log entries.

In a third aspect of the present disclosure, a computer program product is provided that is tangibly stored on a computer-readable medium and includes machine-executable instructions, wherein the machine-executable instructions, when executed, cause a machine to perform the method according to the first aspect.

In the embodiments of the present disclosure, with the solution for data processing of the present application, it is possible to easily acquire logs for an operation using identification information that includes a field indicating the content of the operation, so as to facilitate targeted analysis of the operation based on the content of the operation.

The Summary of the Invention is provided to introduce the selection of concepts in a simplified form, which will be further described in the Detailed Description below. The Summary of the Invention is neither intended to identify key features or main features of the embodiments of the present disclosure, nor intended to limit the scope of the present disclosure.

BRIEF DESCRIPTION OF THE DRAWINGS

The above and other objectives, features, and advantages of embodiments of the present disclosure will become more apparent by describing example embodiments of the present disclosure in more detail in combination with the accompanying drawings. In the example embodiments of the present disclosure, the same reference numerals generally represent the same parts.

FIG. 4 illustrates a schematic diagram of a log for an operation according to some embodiments of the present disclosure;

FIG. 5 illustrates a schematic diagram of a group of logs and a log pattern according to some embodiments of the present disclosure.

DETAILED DESCRIPTION

Figure 1:
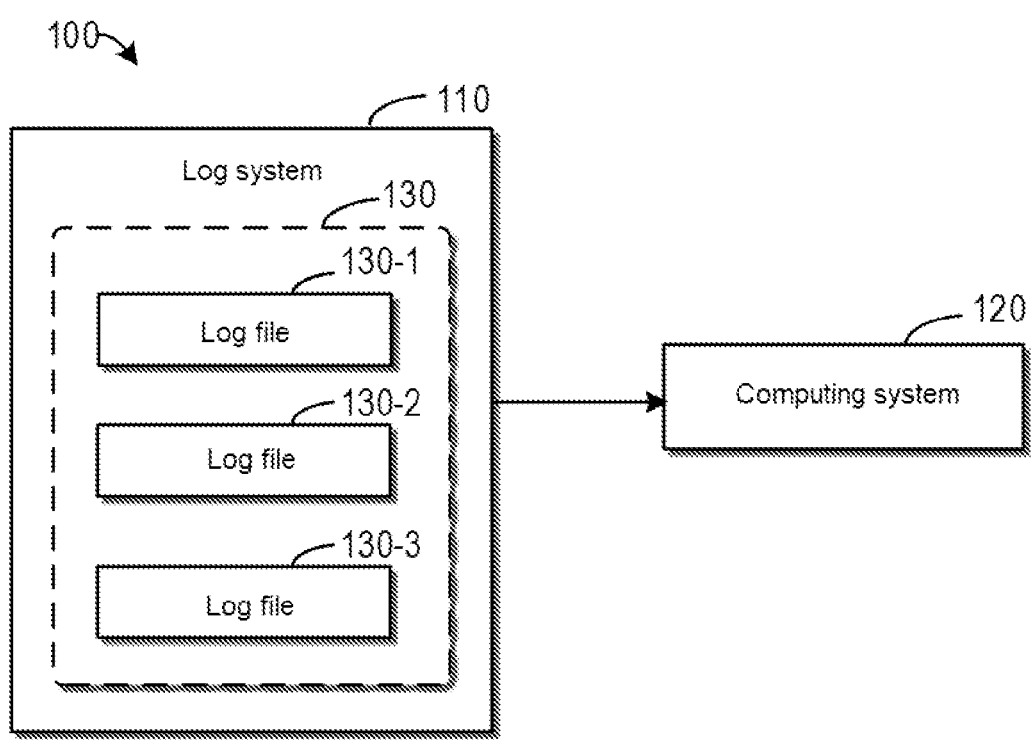
FIG. 1 illustrates a schematic diagram of an environment in which embodiments of the present disclosure can be implemented.

The principles of the embodiments of the present disclosure will be described below with reference to several example embodiments shown in the accompanying drawings. Although preferred embodiments of the present disclosure are illustrated in the accompanying drawings, it should be understood that these embodiments are described only to enable those skilled in the art to better understand and then implement the embodiments of the present disclosure, and are not intended to impose any limitation to the scope of the present disclosure.

The term "include" and variants thereof used herein indicate open-ended inclusion, that is, "including but not limited to." Unless specifically stated, the term "or" means "and/or." The term "based on" means "based at least in part on." The terms "an example embodiment" and "some embodiments" mean "at least one example embodiment." The term "another embodiment" indicates "at least one additional embodiment." The terms "first," "second," and the like may refer to different or identical objects. Other explicit and implicit definitions may also be included below.

As mentioned above, although the cause of the problem can be found through the logs, it is difficult to filter the log entries related to a specific operation from a large number of logs and analyze the cause of the problem. Typically, a trace identifier (trace ID) corresponding to a specific operation can be used to filter log entries related to a specific operation in a large number of logs. For example, the universal unique identifier (UUID) of the operation can be used as the trace identifier. However, a trace identifier is usually a random combination of letters and numbers and does not contain any information about the operation. Therefore, it is difficult to perform targeted analysis of the filtered log entries in relation to the content of the operation.

The embodiments of the present disclosure propose a solution for data processing. This solution includes determining identification information for an operation, wherein the identification information includes at least one field indicating content of the operation and a field indicating a unique identification of the operation. The solution further includes identifying, based on the identification information, log entries for the operation in log files for at least one microservice invoked by the operation. The solution further includes determining a log for the operation, wherein the log includes the identified log entries. In this way, it is possible to easily acquire logs for an operation using identification information that includes a field indicating content of the operation, so as to facilitate targeted analysis of the operation based on the content of the operation.

The basic principles and several example embodiments of the present disclosure are described below with reference to FIGS. 1 to 6. It should be understood that these example embodiments are given only to enable those skilled in the art to better understand and thus implement the embodiments of the present disclosure, and are not intended to limit the scope of the present disclosure in any way.

FIG. 1 illustrates environment 100 in which embodiments of the present disclosure can be implemented. As shown in FIG. 1, environment 100 includes log system 110 and computing system 120. Log system 110 is used to maintain log files 130 for microservices. Log files 130 for microservices can include log files for at least one microservice, for example, log file 130-1 for microservice A and log file 130-2 for microservice B as shown in FIG. 1. Log files 130 for microservices include at least one log entry, and the log entry includes information describing the invocation of microservices. For example, the log entry can include time stamps indicating the time when a microservice was invoked. The log entry can also include a field indicating the level of the log entry. The level of the log entry from low to high can include: Debug (DEBUG), Information (INFO), Warning (WARN), Error (ERROR), and Fatal Error (FATAL). The log entry can also include a message describing the invocation of the microservice. For example, the log file for a microservice used for backup can include a log entry with the following message: "back up serverA starts." This message describes that the microservice is invoked to start backing up server A. The log entry can also include thread information, process information, and other content.

Computing system 120 is used to determine logs for a specific operation based on log files 130 for microservices. The operation can be a user-initiated request, such as backing up server A, purchasing item A, etc. Computing system 120 can determine the microservices invoked by the operation. For example, in the example where the operation is to back up server A, this operation may invoke a first microservice for copying data, a second microservice for storing data, and so forth. Computing system 120 can identify log entries related to the operation in log files 130 for the invoked microservices based on the identification information for the operation. Computing system 120 can determine logs for the operation based on the identified log entries. Computing system 120 can be any suitable system for computing and data processing.

It should be understood that environment 100 shown in FIG. 1 is merely an example and should not constitute any limitation to the functions and scope of the implementations described in the present disclosure.

Figure 2:
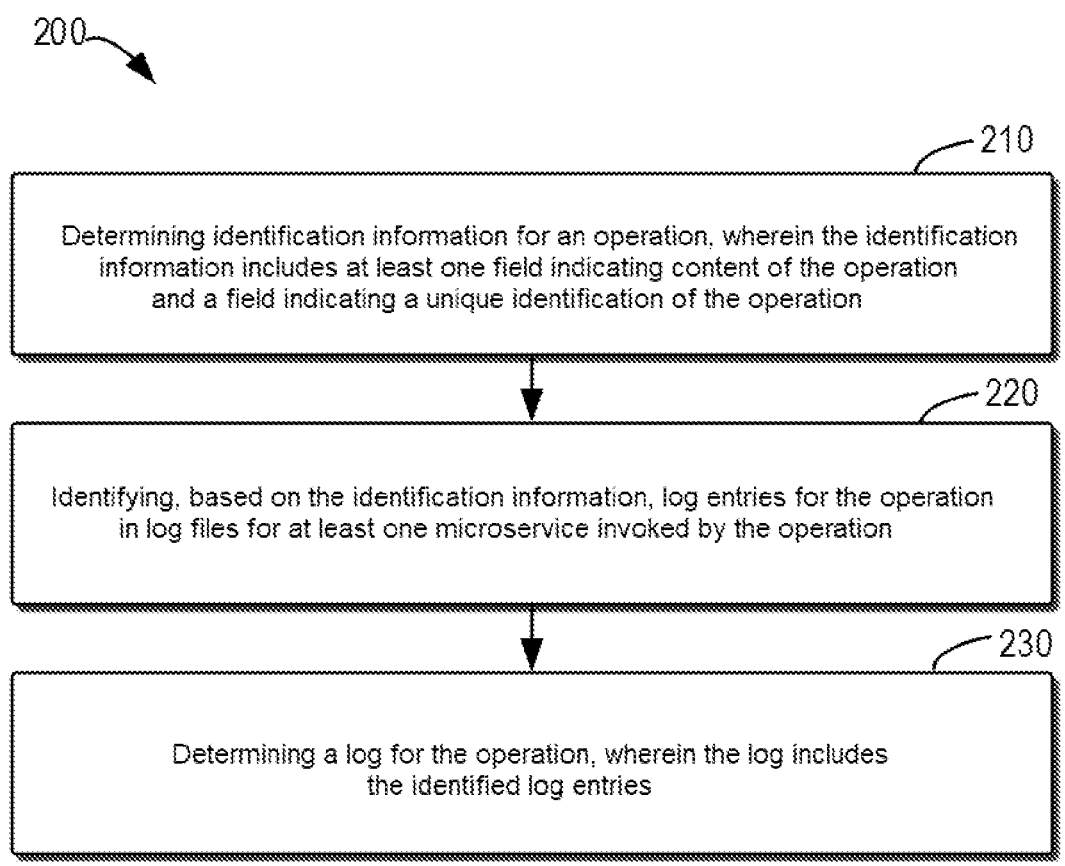
FIG. 2 illustrates a flow chart of an example method for data processing according to some embodiments of the present disclosure.

FIG. 2 illustrates a flow chart of example method 200 for data processing according to some embodiments of the present disclosure. Method 200 can be implemented, for example, in environment 100 as shown in FIG. 1. It should be understood that method 200 may also include additional actions not shown and/or may omit actions shown, and the scope of the present disclosure is not limited in this regard. Method 200 is described below with reference to FIGS. 1-3.

Figure 3:
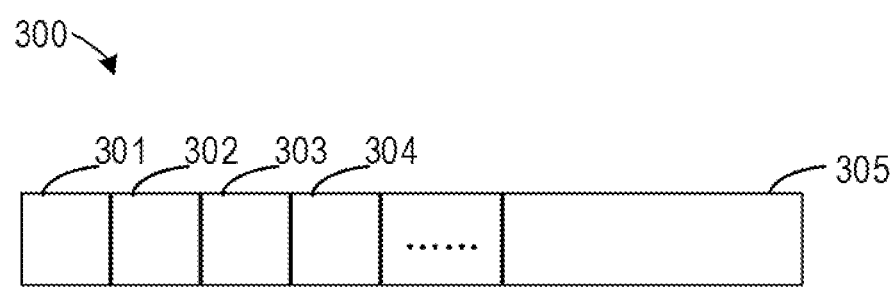
FIG. 3 illustrates a schematic diagram of identification information according to some embodiments of the present disclosure.

At block 210, identification information for an operation is determined. The identification information includes at least one field indicating content of the operation and a field indicating a unique identification of the operation. FIG. 3 illustrates a schematic diagram of identification information 300 according to some embodiments of the present disclosure. In some embodiments, examples of the content of the operation can include a property of the operation, an action performed by the operation, and an object targeted by the operation. As shown in FIG. 3, identification information 300 can include field 301 indicating the action performed by the operation, field 302 indicating the object targeted by the operation, field 303 indicating the first property of the operation, and field 304 indicating the second property of the operation.

In an example scenario of data management, the property of the operation can refer to backing up from a virtual machine, restoring to a virtual machine, backing up a database, or backing up a file system. The actions performed by the operation can refer to backup, restore, etc. The object targeted by the operation can refer to Server A, Database B, File System C, etc. It should be understood that in other application scenarios, the content of the operation can include other information. For example, in an example scenario of online shopping, the content of the operation can also include a user who initiated the operation. In this case, identification information 300 can include a field indicating the identity of the user.

Identification information 300 further includes a field indicating a unique identification of the operation. Examples of the unique identification of the operation can include the UUID of the operation, a portion of the UUID, and any suitable identifier uniquely associated with the operation. As shown in FIG. 3, identification information 300 can include field 305 that indicates a unique identification of the operation. Field 305 can be the first 32 bits of the UUID of the operation.

Identification information 300 can be generated in a variety of manners. Identification information 300 can be determined by encoding the content of the operation and the unique identification of the operation as a combination of numbers, letters, and/or symbols. For example, the action performed by the operation can be encoded as a 2-bit hexadecimal number. In other words, field 301 indicating the action performed by the operation can include a 2-bit hexadecimal number and can be used to indicate $16^2$ actions.

Log system 110 can record identification information 300 in a corresponding log entry. For example, when the operation invokes microservice A, log file 130-1 for microservice A will record information related to the invocation of microservice A by the operation, and such information includes identification information 300 for the operation.

With continued reference to FIG. 2, at block 220, log entries for the operation in log files 130 for at least one microservice invoked by the operation are identified based on identification information 300. It should be understood that log files 130 for microservices include log entries for a plurality of operations. Computing system 120 can identify log entries related to a specific operation by filtering log entries that include identification information 300.

At block 230, a log for the operation is determined. The log includes the identified log entries. Based on the identified log entries, computing system 120 can determine the log for a specific operation. The log for the operation includes the identified log entries. The log for the operation can also include, for each log entry, information indicating the source of the log entry. That is, the log for the operation can also include an identification of the microservice corresponding to each log entry.

FIG. 4 illustrates a schematic diagram of log 400 for an operation according to some embodiments of the present disclosure. Log 400 can be a log for a specific operation, wherein the specific operation can be identified using the example "010101d6b9ae19ff" of identification information 300 as shown in FIG. 4. This specific operation can be an operation of "backing up Server A on a source platform of virtual machine type to a target platform of virtual machine type" performed on Dec. 26, 2020. In this example of identification information 300, the first two bits can be field 301 indicating the action performed by the operation, and "01" can indicate that the action performed is "backup." The next two bits can be field 303 indicating the first property of the operation, and "01" can indicate that the first property of the operation is "the source platform is of virtual machine type." The further next two bits can be field 304 indicating the second property of the operation, and "01" can indicate that the second property of the operation is "the target platform is of virtual machine type." The further next eight bits can be field 302 indicating the object of the operation, and "d6b9ae19" can indicate that the object of the operation is "serverA." The last two bits "ff" can be field 305 indicating the unique identification of the operation and can be used to separate a plurality of executions of operations of the same type.

As shown in FIG. 4, log 400 can include log entries for a plurality of microservices obtained from log files 130 for a plurality of microservices. Log 400 can include the identifications of microservices, such as microservice A, microservice B, and microservice C as illustrated in FIG. 4. The log entries in log 400 can include a time stamp (e.g., 2020-12-26T20:19:10.123Z), level (e.g., INFO), and message (e.g., "backup serverA starts").

In this way, it is possible to easily acquire log 400 for the operation by using identification information 300 that includes the field indicating the content of the operation. Moreover, since identification information 300 includes a field indicating the content of the operation, a targeted analysis can be performed on log 400 for the operation based on the content of the operation. For example, if identification information 300 indicates that the object of the backup operation is serverB, and the log entry "back up serverA starts" appears in the log for that backup operation, it can be analyzed that the problem may probably be due to the wrong object of the backup.

In some embodiments, computing system 120 can also extract structured data from log 400 for the operation and, based on the analysis of the structured data, determine abnormal log entries in log 400. Examples of the structured data can include time stamps, IP addresses, etc. in the log entries. The analysis of the structured data can make use of a variety of mathematical operations, e.g., polynomial fitting, machine learning algorithms, etc. In an example, the time spent for each step of the operation can be calculated by computing the difference between the time stamps in log 400. For example, based on the analysis of the time stamps in log 400 shown in FIG. 4, it can be found that it takes the longest time to invoke microservice C to transfer data. In some embodiments, based on predetermined rules, abnormal log entries in log 400 can be determined. For example, a time threshold can be set for the time spent at each step, and a log entry corresponding to the step that exceeds the time threshold can be identified as an abnormal log entry. Alternatively or additionally, an abnormality related to the operation can be predicted based on the predetermined rules. For example, by comparing the time spent on performing the same step at different times, it is possible to predict how long it will take to perform that step in the future. If this predicted time exceeds a predetermined threshold, an abnormality can be predicted to occur.

In some embodiments, computing system 120 can also determine a group of logs for a group of operations for use in analysis. Particularly, computing system 120 can determine a group of logs for a group of operations, wherein the set of identification information for the group of operations includes at least one identical field in the at least one field indicating the content of the operation. Computing system 120 can also determine a log pattern corresponding to the group of operations based on pattern matching between the group of logs.

FIG. 5 illustrates a schematic diagram of a group of logs and a log pattern according to some embodiments of the present disclosure. FIG. 5 illustrates a plurality of examples of logs, including log 400, log 510, log 520, and log 530. Similar to log 400, log 510 is a log for an operation of "backing up server A on a source platform of virtual machine type to a target platform of virtual machine type" performed on Dec. 27, 2020, log 520 is a log for an operation of "backing up server B on a source platform of virtual machine type to a target platform of virtual machine type" performed on Dec. 26, 2020, and log 530 is a log for an operation of "backing up server B on a source platform of virtual machine type to a target platform of virtual machine type" performed on Dec. 27, 2020. Log 400, log 510, log 520, and log 530 can include identification information 300 for the respective operations.

As described above, the corresponding identification information 300 for the group of logs for the group of operations includes the at least one identical field in the at least one field indicating the content of the operation. In other words, the operations having identification information 300 including identical fields indicating the content of the operations can be grouped into a group of operations, and the logs corresponding to that group of operations can be grouped into a group of logs. For example, log 400, log 510, log 520, and log 530 can be grouped into a group of logs for which a set of identification information 300 includes three identical fields, i.e., field 301 indicating the action performed by the operation, field 303 indicating the first property of the operation, and field 304 indicating the second property of the operation. In another example, log 400 and log 510 can be grouped into a group of logs for which a set of identification information 300 includes four identical fields, i.e., field 301, field 303, field 304, and field 302 indicating the object of the operation. In this way, logs for different operations can be grouped into a group of logs based on identification information 300 in accordance with different classification granularities, so as to facilitate the execution of targeted analysis for the content of the operations.

In some embodiments, computing system 120 can extract structured data from a group of logs for a group of operations and predict anomalies related to the operations based on analysis of the structured data. For example, log 400 and log 510 of which identification information 300 includes identical fields 301, 302, 303, and 304 can be grouped into a group of operations. By analyzing the time stamps in both logs, it can be found that the time taken to invoke microservice C to transfer data exceeds the time threshold, so it can be predicted that the subsequent execution of the operation of "backing up server A on a source platform of virtual machine type to a target platform of virtual machine type" may take too much time to meet the service requirements.

In some embodiments, computing system 120 can also determine a log pattern corresponding to the group of operations based on pattern matching between the group of logs. Pattern matching between logs can be implemented using a variety of algorithms, for example, plain pattern matching, fast pattern matching, machine learning algorithms, etc. Based on pattern matching, computing system 120 can determine the log pattern corresponding to the group of operations. The log pattern can define the same strings and/or numbers in the group of logs, or it can identify unmatched strings and/or numbers as variables. For example, log pattern 540 shown in FIG. 5 defines a plurality of strings (e.g., "delta data transferred") and identifies a variable NNN of numeric type and a variable SSS of string type.

In some embodiments, computing system 120 can analyze the target operation based on a comparison between the target log for the target operation and the log pattern. The target operation can be an operation to be analyzed. It should be understood that identification information 300 for the target operation includes identical fields indicating the content of the operation as those included in identification information 300 for a group of operations corresponding to log pattern 540. For example, in the case where identification information 300 for the group of operations corresponding to log pattern 540 includes identical field 301 and field 302, identification information 300 for the target operation should include identical field 301 and field 302. In other words, target operations of the same type as that of the group of operations can be analyzed based on log pattern 540. For example, based on log pattern 540 determined by the logs corresponding to multiple executions of operations of the same type, the logs corresponding to another execution of an operation of the same type can be analyzed, so as to analyze whether the operation for that execution is abnormal.

In some embodiments, computing system 120 can determine the values in the target log that correspond to the variables in log pattern 540 by comparison between the target log for the target operation and the corresponding log pattern 540. If the determined values do not satisfy predefined conditions of the variables, computing system 120 can determine that the target operation is an abnormal operation. The comparison between the target log and log pattern 540 can be implemented by various methods, for example, pattern matching, keyword matching, machine learning algorithms, etc. The predefined conditions for the variables can be the size of a number, the length of a string, etc. For example, for log pattern 540 shown in FIG. 5, the predefined condition of the variable SSS in "back up SSS starts" can be set to be: SSS equals "serverA." In this case, if the value in the target log that corresponds to the SSS is determined to be "serverB," the target operation can be determined to be an abnormal operation.

Alternatively or additionally, computing system 120 can determine abnormal log entries in the target log by comparison between the target log for the target operation and the corresponding log pattern 540. In some embodiments, a log entry in the target log that has a low similarity to the corresponding log entry of log pattern 540 can be identified as an abnormal log entry. In some embodiments, log entries that appear only in the target log can be identified as abnormal log entries. For example, in the case where log 530 is the target log, a log entry that appears only in log 530 and that includes the message "cannot connect storage, retry" can be determined as an abnormal log entry.

In some embodiments, computing system 120 can determine that the target operation is an abnormal operation if it is determined that the target log for the target operation has an abnormality degree above a threshold value. In some embodiments, the abnormality degree can be based on the similarity between the target log and the log pattern. The similarity can be determined through pattern matching. The similarity can be evaluated in a variety of ways, for example, the length of identical strings, the number of identical strings, etc.

Alternatively or additionally, the abnormality degree can also be based on the number of log entries in the target log that have a level of warning or higher. In some embodiments, a weight can also be set for a log entry based on the level of the corresponding log entry, thereby calculating a score for the target log to evaluate the abnormality degree of the target log. For example, weights 1.0, 1.0, 1.1, 1.2, and 1.3 can be set for Debug, Information, Warning, Error, and Fatal Error levels, respectively.

In this way, it is possible to easily acquire logs for an operation using identification information 300 that includes a field indicating content of the operation, so as to facilitate targeted analysis of the operation based on the content of the operation. For example, operations can be grouped based on the contents of the operations, and log pattern 540 for that group of operations can be determined. Based on the comparison of the target operation with log pattern 540, it is possible to determine whether the target operation is an abnormal operation, as well as to determine abnormal entries in the target log, so as to facilitate the determination of abnormal steps in the operation. In addition, it is also possible to predict, based on a group of operations of the same type, whether an abnormality will occur for an operation of the same type that will be executed in the future.

Figure 6:
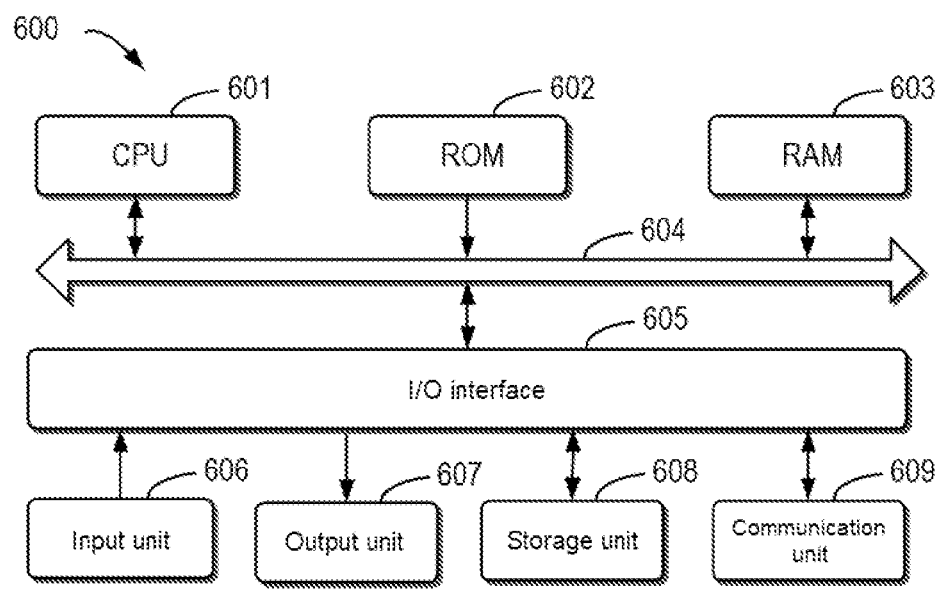
FIG. 6 illustrates a block diagram of an example computing device that can be used to implement embodiments of the present disclosure.

FIG. 6 illustrates a schematic block diagram of example device 600 that can be used to implement the embodiments of the present disclosure. For example, device 600 can be implemented at environment 100 as shown in FIG. 1. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit

609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200, may be performed by processing unit 601. For example, in some embodiments, method 200 may be implemented as a computer software program that is tangibly included in a machine-readable medium, such as storage unit 608. In some embodiments, part or all of the computer program may be loaded and/or installed onto device 600 via ROM 602 and/or communication unit 609. When the computer program is loaded to RAM 603 and executed by CPU 601, one or more actions of method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), an SRAM, a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-related instructions, microcode, firmware instructions, status setting data, or source code or object code written in any combination of one or more programming languages, the programming languages including object oriented programming languages, such as Smalltalk, C++, and the like, and conventional procedural programming languages, such as the "C" language or similar programming languages. The computer-readable program instructions may be executed entirely on a user computer, partly on a user computer, as a stand-alone software package, partly on a user computer and partly on a remote computer, or entirely on a remote computer or server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of the blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A computer-implemented method for data processing, comprising:
    identifying, in a computing system, invocation of a microservice by an operation of the computing system;
    generating, in response to invocation of the microservice, identification information for the operation by encoding information related to invocation of the microservice into at least one field indicating content of the operation;
    recording, in a log file, the identification information for the operation in a log entry corresponding to the operation;
    analyzing a plurality of log entries of the computing system to determine a set of identification information for a group of operations corresponding to a type of operation of a target log for a target operation, wherein each identification information in the set of identification information corresponds to a respective operation in the group of operations and each identification information includes at least one field indicating content of the target operation and a field indicating a unique identification of the type of operation, wherein the log entry is included in the plurality of log entries and the operation is included in the group of operations;
    identifying, based on the set of identification information, log entries for the group of operations in a plurality of log files for the microservice invoked by the type of operation, wherein the plurality of log files include the log file;
    determining a group of logs for the group of operations, the group of logs including a first log for the type of operation and a second log for the type of operation, wherein the first log includes a first portion of the identified log entries corresponding to a first execution of the type of operation and the second log includes a second portion of the identified log entries corresponding to a second execution of the type of operation;
    determining, by electronic circuitry implementing a machine learning algorithm, a log pattern corresponding to the group of operations based on pattern matching between at least the first and second logs in the group of logs, wherein the log pattern includes a first pattern of a first corresponding log entry of the first and second logs and a second pattern of a second corresponding log entry of the first and second logs;
    determining an abnormality degree for the target operation based on comparison of the log pattern with the target log; and
    identifying an abnormal log entry in the target log based on comparison of the abnormality degree for the target operation with a threshold,
    wherein the abnormality degree for the target log of the target operation is based on a weight assigned to each respective log entry in the target log and the weight is assigned based on a level of each respective log entry in the target log, and
    wherein the level comprises a debug level, an information level, a warning level, an error level, and a fatal error level with the respective weights of 1.0, 1.0, 1.1, 1.2, and 1.3.

2. The method according to claim 1, wherein the content of the target operation comprises at least one of:
    a property of the target operation;
    an action performed by the target operation; and
    an object targeted by the target operation.

3. The method according to claim 1, wherein the log pattern includes a variable of string type or numeric type, and wherein the method further comprises:
    determining, based on a comparison between the target log for the target operation and the log pattern, a value in the target log corresponding to the variable, wherein identification information for the target operation includes the at least one identical field; and
    when determining that the value does not satisfy a predefined condition for the variable, determining at least one of the following:
        that the target operation is an abnormal operation; and
        abnormal log entries in the target log.

4. The method according to claim 1, further comprising:
    extracting structured data from the target log for the target operation;
    based on an analysis of the structured data, performing at least one of:
        determining abnormal log entries in the target log; and
        predicting an abnormality related to the target operation.

5. The method according to claim 1, wherein the abnormal log entry in the target log is identified based on comparison of the first pattern in the log pattern with a corresponding log entry in the target log.

6. The method according to claim 1, wherein the log pattern includes at least one string or number included in at least one variable corresponding to unmatched strings or numbers in logs included in the group of logs.

7. The method according to claim 1, wherein the abnormality degree for the target operation is determined based on at least one of a length of identical strings between the target log and the log pattern or a number of identical strings between the target log and the log pattern.

8. The method according to claim 1, wherein encoding information related to invocation of the microservice into the at least one field indicating content of the operation includes encoding the information into a hexadecimal number.

9. The method according to claim 1, further comprising predicting an abnormality with a subsequent execution of the target operation based on the abnormal log entry.

10. An electronic device, comprising:
a processor; and
a memory coupled to the processor, the memory having instructions stored therein that, when executed by the processor, cause the processor to perform actions, the actions comprising:
identifying, in a computing system, invocation of a microservice by an operation of the computing system;
generating, in response to invocation of the microservice, identification information for the operation by encoding information related to invocation of the microservice into at least one field indicating content of the operation;
recording, in a log file, the identification information for the operation in a log entry corresponding to the operation;
analyzing a plurality of log entries of the computing system to determine a set of identification information for a group of operations corresponding to a type of operation of a target log for a target operation, wherein each identification information in the set of identification information corresponds to a respective operation in the group of operations and each identification information includes at least one field indicating content of the target operation and a field indicating a unique identification of the type of operation, wherein the log entry is included in the plurality of log entries and the operation is included in the group of operations;
identifying, based on the set of identification information, log entries for the group of operations in a plurality of log files for the microservice invoked by the type of operation, wherein the plurality of log files include the log file;
  determining a group of logs for the group of operations, the group of logs including a first log for the type of operation and a second a log for the type of operation, wherein the first log includes a first portion of the identified log entries corresponding to a first execution of the type of operation and the second log includes a second portion of the identified log entries corresponding to a second execution of the type of operation;
  determining, via a machine learning algorithm, a log pattern corresponding to the group of operations based on pattern matching between at least the first and second logs in the group of logs, wherein the log pattern includes a first pattern of a first corresponding log entry of the first and second logs and a second pattern of a second corresponding log entry of the first and second logs;
  determining an abnormality degree for the target operation based on comparison of the log pattern with the target log; and
  identifying, via a machine learning algorithm, an abnormal log entry in the target log based on comparison of the abnormality degree for the target operation with a threshold,
wherein the abnormality degree for the target log of the target operation is based on a weight assigned to each respective log entry in the target log and the weight is assigned based on a level of each respective log entry in the target log, and
  wherein the level comprises a debug level, an information level, a warning level, an error level, and a fatal error level with the respective weights of 1.0, 1.0, 1.1, 1.2, and 1.3.

11. The device according to claim 10, wherein the content of the target operation comprises at least one of:
  a property of the target operation;
  an action performed by the target operation; and
  an object targeted by the target operation.

12. The device according to claim 10, wherein the log pattern comprises a variable of string type or numeric type, and wherein the actions further comprise:
  determining, based on a comparison between the target log for the target operation and the log pattern, a value in the target log corresponding to the variable, wherein identification information for the target operation comprises the at least one identical field; and
  when determining that the value does not satisfy a predefined condition for the variable, determining at least one of the following:
    that the target operation is an abnormal operation; and
    abnormal log entries in the target log.

13. The device according to claim 10, wherein the actions further comprise:
  extracting structured data from the target log for the target operation;
  based on an analysis of the structured data, performing at least one of:
    determining abnormal log entries in the target log; and
    predicting an abnormality related to the target operation.

14. The device according to claim 10, wherein the log pattern includes at least one string or number included in at least one variable corresponding to unmatched strings or numbers in logs included in the group of logs.

15. The device according to claim 10, wherein the abnormality degree for the target operation is determined based on at least one of a length of identical strings between the target log and the log pattern or a number of identical strings between the target log and the log pattern.

16. A non-transitory computer-readable medium having instructions stored therein, which when executed by a processor, cause the processor to perform actions, the actions comprising:
identifying, in a computing system, invocation of a microservice by an operation of the computing system;
generating, in response to invocation of the microservice, identification information for the operation by encoding information related to invocation of the microservice into at least one field indicating content of the operation;
recording, in a log file, the identification information for the operation in a log entry corresponding to the operation;
analyzing a plurality of log entries of the computing system to determine a set of identification information for a group of operations corresponding to a type of operation of a target log for a target operation, wherein each identification information in the set of identification information corresponds to a respective operation in the group of operations and each identification information includes at least one field indicating content of the target operation and a field indicating a unique identification of the type of operation, wherein the log entry is included in the plurality of log entries and the operation is included in the group of operations;
identifying, based on the set of identification information, log entries for the group of operations in a plurality of log files for the microservice invoked by the type of operation, wherein the plurality of log files include the log file;

determining a group of logs for the group of operations, the group of logs including a first log for the type of operation and a second log for the type of operation, wherein the first log includes a first portion of the identified log entries corresponding to a first execution of the type of operation and the second log includes a second portion of the identified log entries corresponding to a second execution of the type of operation;

determining, via a machine learning algorithm, a log pattern corresponding to the group of operations based on pattern matching between at least the first and second logs in the group of logs, wherein the log pattern includes a first pattern of a first corresponding log entry of the first and second logs and a second pattern of a second corresponding log entry of the first and second logs;

determining an abnormality degree for the target operation based on comparison of the log pattern with the target log; and identifying an abnormal log entry in the target log based on comparison of the abnormality degree for the target operation with a threshold, wherein the abnormality degree for the target log of the target operation is based on a weight assigned to each respective log entry in the target log and the weight is assigned based on a level of each respective log entry in the target log, and wherein the level comprises a debug level, an information level, a warning level, an error level, and a fatal error level with the respective weights of 1.0, 1.0, 1.1, 1.2, and 1.3.

17. The computer-readable medium according to claim 16, wherein the content of the target operation comprises at least one of:
   a property of the target operation;
   an action performed by the target operation; and
   an object targeted by the target operation.

18. The computer-readable medium according to claim 16, wherein the log pattern comprises a variable of string type or numeric type, and wherein the actions further comprise:
   determining, based on a comparison between the target log for the target operation and the log pattern, a value in the target log corresponding to the variable, wherein identification information for the target operation comprises the at least one identical field; and
   when determining that the value does not satisfy a predefined condition for the variable, determining at least one of the following:
      that the target operation is an abnormal operation; and
      abnormal log entries in the target log.

19. The computer-readable medium according to claim 16, wherein the log pattern includes at least one string or number included in at least one variable corresponding to unmatched strings or numbers in logs included in the group of logs.

20. The computer-readable medium according to claim 16, wherein the abnormality degree for the target operation is determined based on at least one of a length of identical strings between the target log and the log pattern or a number of identical strings between the target log and the log pattern.

* * * * *